US011164005B1

(12) United States Patent
Burshtein et al.

(10) Patent No.: US 11,164,005 B1
(45) Date of Patent: Nov. 2, 2021

(54) SYSTEM AND METHOD FOR REDUCING RESOURCES COSTS IN VISUAL RECOGNITION OF VIDEO BASED ON STATIC SCENE SUMMARY

(71) Applicant: International Business Machines Corporation, Armonk, NY (US)

(72) Inventors: Yevgeny Burshtein, Nesher (IL); Daniel Nechemia Rotman, Haifa (IL); Dror Porat, Haifa (IL); Udi Barzelay, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/846,357

(22) Filed: Apr. 12, 2020

(51) Int. Cl.
*G06K 9/00* (2006.01)
*G06K 9/62* (2006.01)
*G06K 9/68* (2006.01)

(52) U.S. Cl.
CPC ..... *G06K 9/00744* (2013.01); *G06K 9/00718* (2013.01); *G06K 9/00765* (2013.01); *G06K 9/6215* (2013.01); *G06K 9/6218* (2013.01); *G06K 9/6857* (2013.01)

(58) Field of Classification Search
CPC ............. G06K 9/00744; G06K 9/6218; G06K 9/00718; G06K 9/6857; G06K 9/6216; G06K 9/00765
See application file for complete search history.

(56) References Cited

U.S. PATENT DOCUMENTS

| 8,027,541 | B2 | 9/2011 | Hua | |
|---|---|---|---|---|
| 8,170,280 | B2 | 5/2012 | Zhao | |
| 9,524,449 | B2 | 12/2016 | Yang | |
| 10,013,614 | B2 | 7/2018 | Granström | |
| 2009/0007202 | A1* | 1/2009 | Williams | ........... H04N 7/17309 |
| | | | | 725/105 |

(Continued)

FOREIGN PATENT DOCUMENTS

KR          101323369 B1     10/2013

OTHER PUBLICATIONS

Hosseini, H.; Xiao, B.; Clark, A.; and Poovendran, R. Oct. 2017. Attacking automatic video analysis algorithms: A case study of google cloud video intelligence api. In Proceedings of the 2017 on Multimedia Privacy and Security, 21-32. ACM.

(Continued)

*Primary Examiner* — Casey L Kretzer
(74) *Attorney, Agent, or Firm* — Gregory J. Kirsch (57) ABSTRACT

Embodiments may provide techniques that provide identification of images that can provide reduced resource utilization due to reduced sampling of video frames for visual recognition. For example, in an embodiment, a method of visual recognition processing may be implemented in a computer system comprising a processor, memory accessible by the processor, and computer program instructions stored in the memory and executable by the processor, the method comprising: coarsely segmenting video frames of video stream into a plurality of clusters based on scenes of the video stream, sampling a plurality of video frames from each cluster; determining a quality of each cluster, re-clustering the video frames of video stream to improve the quality of at least some of the clusters.

18 Claims, 4 Drawing Sheets

(56) References Cited

U.S. PATENT DOCUMENTS

2018/0307943 A1* 10/2018 Savkli .................. G06K 9/033

OTHER PUBLICATIONS

Li, F.-F. Mar. 8, 2017. Announcing google cloud video intelligence api, and more cloud machine learning updates. cloud. google. com/blog 8.

Rotman, D.; Porat, D.; and Ashour, G., Dec. 2016. Robust video scene detection using multimodal fusion of optimally grouped features. In Multimedia Signal Processing (MMSP), 2017 IEEE 19th International Workshop on, 1-6. IEEE.

Rotman, D.; Porat, D.; Ashour, G.; and Barzelay, U. Jun. 2018. Optimally grouped deep features using normalized cost for video scene detection. In Proceedings of the 2018 ACM on International Conference on Multimedia Retrieval, 187-195. ACM.

Rotman, Daniel, et al., Temporal Video Analyzer (TVAN): Efficient Temporal Video Analysis for Robust Video Description and Search, IBM Research AI, Haifa, Israel, AAAI (2019), 2 pages.

Rui, Y.; Huang, T. S.; and Mehrotra, S., Sep. 1999. Constructing table-of-content for videos. Multimedia systems 7(5):359-368.

Russakovsky, O.; Deng, J.; Su, H.; Krause, J.; Satheesh, S.; Ma, S.; Huang, Z.; Karpathy, A.; Khosla, A.; Bernstein, M.; et al., Dec. 2015. Imagenet large scale visual recognition challenge. International Journal of Computer Vision 115(3):211-252.

Slavik, P., Nov. 1997. A tight analysis of the greedy algorithm for set cover. Journal of Algorithms 25(2):237-254.

Song, J.; Gao, L.; Liu, L.; Zhu, X.; and Sebe, N., Mar. 2018. Quantization-based hashing: a general framework for scalable image and video retrieval. Pattern Recognition 75:175-187.

KR 101323369 Bl (Univ. Hanyang Ind. Coop. Found.) Oct. 30, 2013 (Oct. 30, 2013) description, paragraphs 0015-0060, figures 1-14.

* cited by examiner

SYSTEM AND METHOD FOR REDUCING RESOURCES COSTS IN VISUAL RECOGNITION OF VIDEO BASED ON STATIC SCENE SUMMARY

BACKGROUND

The present invention relates to techniques that provide identification of images that can provide reduced resource utilization due to reduced sampling of video frames for visual recognition.

Due to the growth of video data on the Internet, automatic video analysis and recognition of images in video streams has become common. Typically, Machine learning (ML) techniques are used for computer vision tasks, particularly recognizing objects in images. However, visual recognition of a given image is expensive in terms of resource utilization.

Accordingly, a need arises for techniques that provide identification of images that can provide reduced resource utilization.

SUMMARY

Embodiments may provide techniques that provide identification of images that can provide reduced resource utilization due to reduced sampling of video frames for visual recognition.

In an embodiment, a method of visual recognition processing may be implemented in a computer system comprising a processor, memory accessible by the processor, and computer program instructions stored in the memory and executable by the processor, the method comprising: coarsely segmenting video frames of video stream into a plurality of clusters based on scenes of the video stream, sampling a plurality of video frames from each cluster; determining a quality of each cluster, re-clustering the video frames of video stream to improve the quality of at least some of the clusters.

In embodiments, coarsely segmenting video frames of video stream may be based on an image similarity of the scenes. Determining the quality of each cluster may be based on a visual recognition results similarity of the clusters. Sampling the plurality of video frames may comprise sampling two frames in the cluster having a maximum similarity distance or maximum dissimilarity from each other. The method may further comprise repeating: the sampling on the re-clustered video frames, determining the quality of each cluster on the re-clustered video frames, and the re-clustering of the video frames of video stream and the visual recognition may improve the quality of the clustering and the re-clustering improves the quality of the visual recognition. The method may further comprise once final clusters have been determined, selecting a representative image from each cluster for visual recognition. At least some of the selected representative images from each cluster may represent a center of the cluster.

In an embodiment, a system for visual recognition processing may comprise a processor, memory accessible by the processor, and computer program instructions stored in the memory and executable by the processor to perform: coarsely segmenting video frames of video stream into a plurality of clusters based on scenes of the video stream, sampling a plurality of video frames from each cluster; determining a quality of each cluster, re-clustering the video frames of video stream to improve the quality of at least some of the clusters.

In an embodiment, a computer program product for visual recognition processing may comprise a non-transitory computer readable storage having program instructions embodied therewith, the program instructions executable by a computer, to cause the computer to perform a method comprising: coarsely segmenting video frames of video stream into a plurality of clusters based on scenes of the video stream, sampling a plurality of video frames from each cluster; determining a quality of each cluster, re-clustering the video frames of video stream to improve the quality of at least some of the clusters.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may provide techniques that provide identification of images that can provide reduced resource utilization due to reduced sampling of video frames for visual recognition. Embodiments may reduce visual recognition (VR) usage costs by performing clustering based on the image similarity, and may perform re-clustering based on the VR results similarity. As a result, VR sampling may be reduced by up to 60% compared to 'frame per second' sampling and up to 20% compared to 'frame per shot' sampling.

Figure 1:
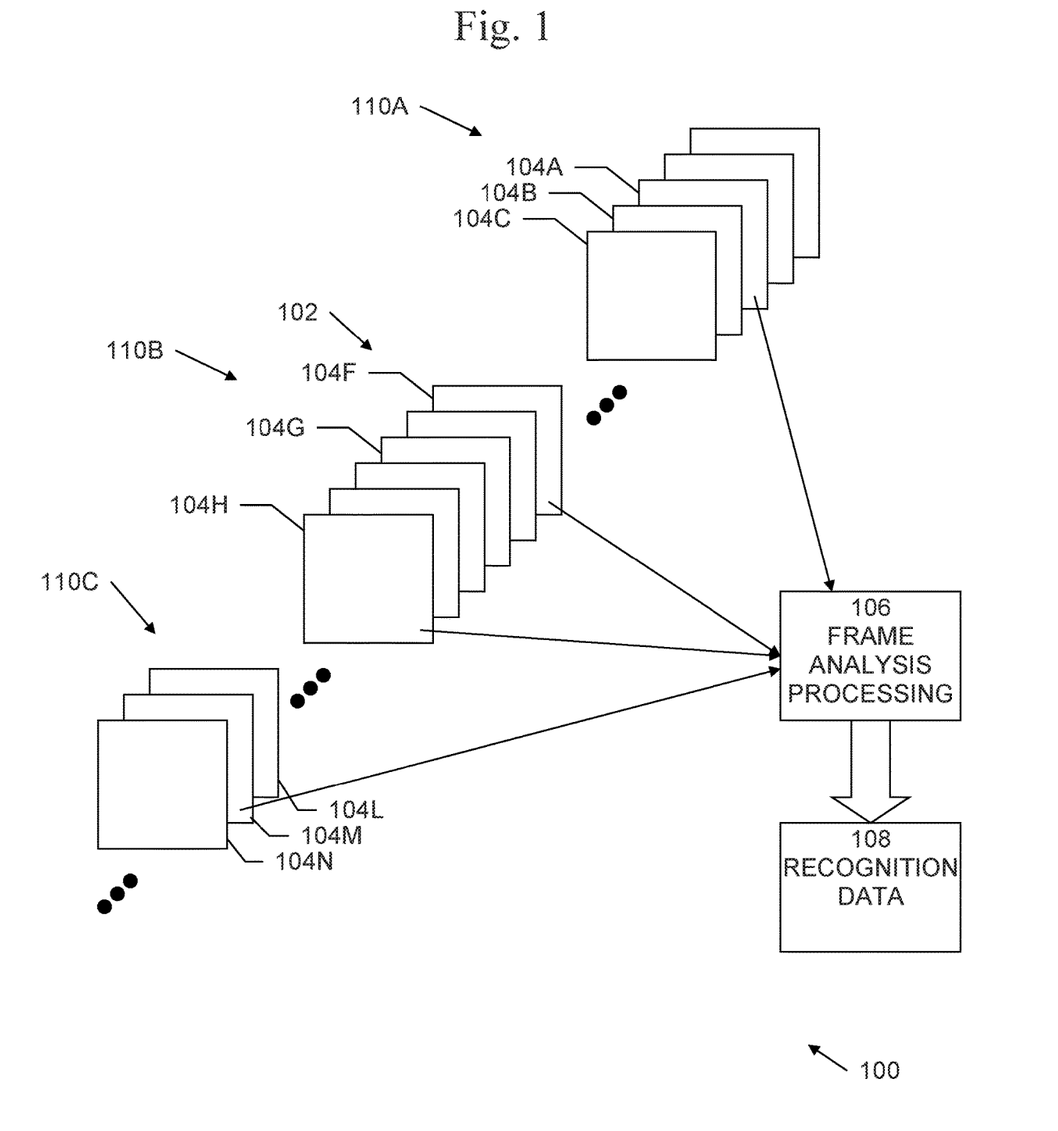
FIG. 1 is an exemplary diagram of a system according to embodiments of the present techniques.

An exemplary system 100 utilizing the present techniques is shown in FIG. 1. As shown in FIG. 1, digital video data 102 may include a stream or series of still images 104A-N, known as frames, which are displayed in rapid succession to create the impression of movement, and in addition, may include audio data. The frequency (rate) at which consecutive frames are displayed is called the Frame Rate and is expressed in frames per second (fps). Frames 104A-N may be processed by frame analysis processing 106 to perform a number of functions, such as visual or image recognition, video annotation, etc. Such functions may enable automated summarization and organization of large amounts of video data, such as for video recommendations, video surveillance, Internet platforms, etc.

Frame analysis processing 106 may use machine learning (ML) techniques for video analysis. One approach is to treat video frames as still images and analyze all frames to generate predictions of the content of the frames. However, processing all video frames is computationally resource intensive even for short video clips, as each video may include many frames. Further, consecutive video frames may overlap with each other in content. Accordingly, the frames to be analyzed may be sampled, that is, only selected frames may be analyzed.

Common techniques for selecting sample frames to be analyzed may include periodic sampling and shot detection.

Periodic sampling may select one or more frames on a fixed or adjustable periodic basis, such as one frame per second. Shot detection may be used to detect when the content or shot of the frames of the video stream has changed significantly and to select one or more frames based on the occurrence of such a shot change.

Figure 2:
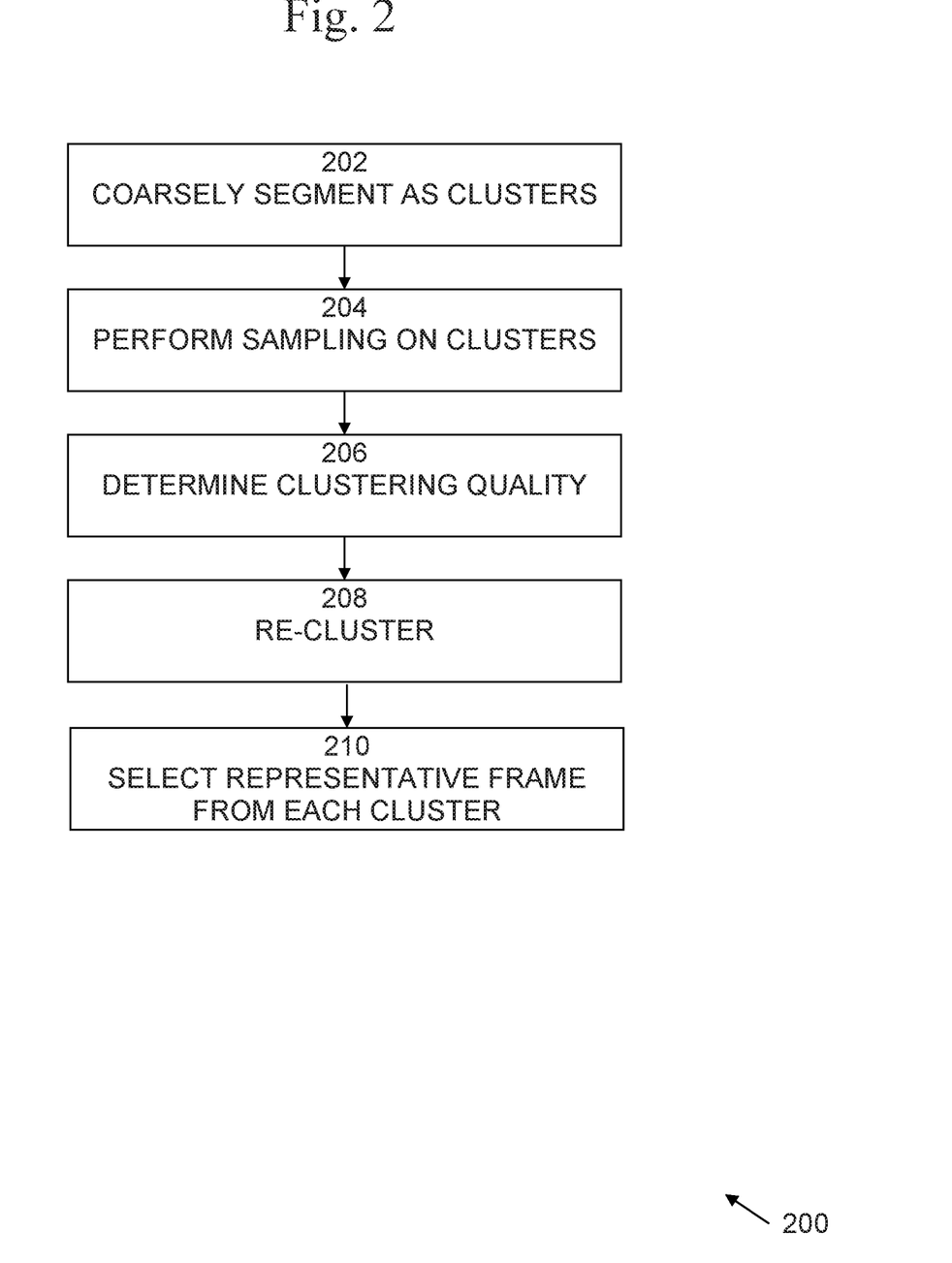
FIG. 2 is an exemplary flow diagram of a process of visual recognition sampling according to embodiments of the present techniques.

FIG. 2 illustrates a process 200 of operation of model 100. It is best viewed in conjunction with FIG. 1. Process 200 begins with 202 in which video stream 102 may be coarsely segmented based on scenes present in video stream 102. For example, video stream 102 may be divided into initial coarse groups or clusters 110A, 110B, 110C, etc., based on the scenes of video stream 102, as determined using, for example, image similarity, not a clustering process, such as is described below. For example, image similarity may be determined using a metric in which the visual similarity between images may be measured. For example, the images may be represented in a feature space, using, for example, conventional methods such as pixel values, color histograms, descriptors, etc., or using, for example, more advanced methods such as deep representations using Convolutional Neural Networks, etc. After generating the representations, a metric may be applied to measure how similar the two images are based on the representations. This may be done, for example, using the cosine similarity, or a Gaussian kernel on the L2 norm for example. In order to group the images into the initial coarse clusters, the points may be depicted in a feature space (or a dimensionality-reduced close equivalent) and when grouping these together into clusters, the assumption is that the "distance" between the points is what represents the dissimilarity.

Each scene segment then may be handled as a separate rough or coarse cluster with the frames in each cluster 110A, 1101B, 110C, etc., being roughly similar. At 204, sampling may be performed on each cluster 110A, 110B, 110C, etc., using, for example, frames having a large separation or maximum distance (dissimilarity) from each other. For example the first frame in each cluster (or a frame near the beginning of each cluster) and the last frame in each cluster (or a frame near the end of each cluster) may be sampled. Typically, such frames having a large separation or distance are the least similar frames in a cluster.

At 206, the quality of each cluster may be determined using the sampled frames by determining the VR results similarity of the sampled frames within each cluster. VR results similarity may be, for example, a metric for how similar the concepts ("tags") from two images are. In practice, VR results similarity may measure how similar two groups of words, generated from the images, are. This can be done using, for example, techniques such as bag of words, intersection over union, word-vector representations, etc.

If the quality of the cluster is good, that is, if the sampled frames (those most likely to be dissimilar) are sufficiently similar, then the sampled frames may be representative of the cluster. For example, the quality of a cluster may be based on whether the images in a cluster have high VR results similarity. This allows the determination of whether the initial clustering (which was based on image similarity) is good enough or needs to be refined. Visual recognition may then be performed only on these sampled frames. As the sampled frames are at least as similar to the other images in the cluster, the results of the visual recognition should then be representative of the whole cluster. Accordingly, high quality visual recognition may be achieved while performing actual visual recognition only on a relatively small sample of the frames in video stream 102. This visual recognition may generate tags describing the sampled frames and these tags may be used to determine the similarity of each cluster. For example, if the sampled frames are not sufficiently similar based on the generated tags, the similarity of the images in the cluster may not be sufficiently high.

In this case, at 208, the frames may be re-clustered. Clustering is a method to divide elements (images given their representations) into groups. This may be done based off of the similarity given above. Examples of clustering approaches may include, K-Means, K-Mediods, Spectral Clustering, Density-Based Spectral Clustering, advanced methods such as Deep Embedded Clustering, etc. In embodiments, a clustering method that is specifically tailored to the problem may be used. Such a method may be termed Max Distance Cluster Tiling (MDCT), which may, for example, be an unsupervised learning method for efficient visual recognition for video. In embodiments, the frames of the video may be represented in a low-level color feature space and may be assigned to clusters using a maximal distance constraint. Limiting the maximum distance that frames are clustered together may assure that the visual elements in the video are represented, while redundancies may be eliminated.

Unlike conventional clustering, MDCT is motivated by the fact that two similar frames, which would return the same visual tags by frame-based visual recognition, will undoubtedly be close together in a low-level color space. Conventional clustering can cluster together large scattered groups of points which might have common features but do not necessarily include the same visual tags.

Embodiments of MDCT may use a technique called greedy cluster aggregation derived from the set cover problem (Slavik 1997), where the frames represent the universe and the sets are frames with a smaller distance than the maximum. Embodiments may leverage the greedy algorithm for polynomial time approximation of the NP-hard set cover problem, which features relatively sound bounds on optimality. For example, the frames that cover the most uncovered frames may be chosen as cluster centers, and they may be added in descending order taking into account a cost function composed of the maximum distance of a frame in each cluster.

Embodiments may cluster (or re-cluster) samples based on a maximum-dissimilarity constraint. Given the goal of inferring concepts on all the images in a cluster, this is important since other methods tend to have both large and small clusters at the same time, which may break the assumption of applying the concepts on the other images in a cluster. Additionally, embodiments may perform an iterative method where we keep dividing more and more until there's an agreement on the sampled VR results. This may be done using MDCT by simply changing the value of the maximum-distance constraint.

For example, this automatically adjustable clustering may be performed using as criteria the maximum distance between the sampled frames and using the visual recognition results similarity, for example, based on the tags. For example, if the sampled frames are not sufficiently similar, the cluster may be split into two new clusters around the two sampled frames. Likewise, if a sampled frame is more similar to a sampled frame in another cluster than it is to the other sampled frame in its cluster, the frames may be re-clustered so that the more similar frames are in the same cluster. Then 204-208 may be repeated until the quality of all or a sufficient number of clusters is sufficiently high based on image similarity and based on visual recognition of the sampled frames during clustering. At 210, once the clusters have been determined, a representative image, which may represent the cluster centers, may be selected from each cluster for visual recognition.

As visual recognition of sampled frames is used to re-cluster the frames, the visual recognition may improve the quality of the clustering, while the re-clustering may improve the quality of the visual recognition.

Figure 3:
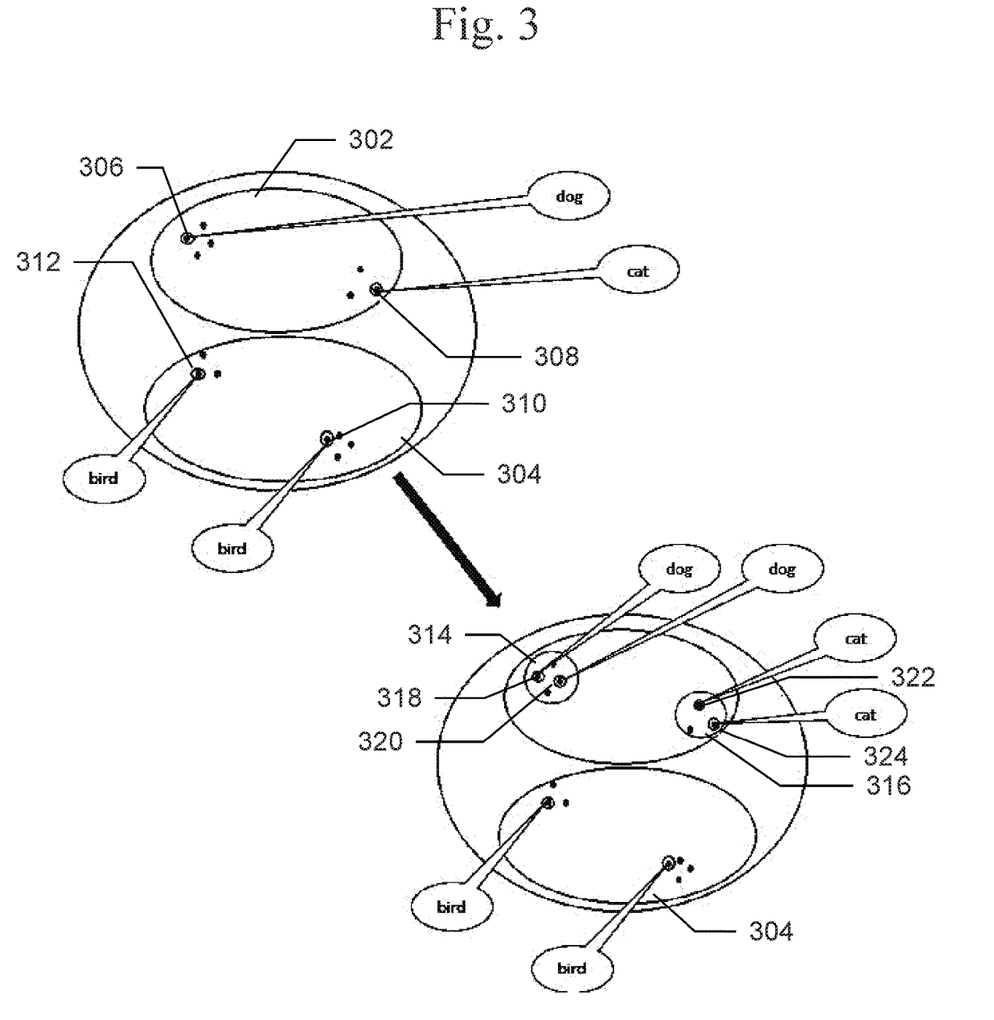
FIG. 3 is an exemplary diagram of clustering according to embodiments of the present techniques.

An example of clustering according to the present techniques is shown in FIG. 3. It is best viewed in conjunction with FIG. 2. As shown in this example, at 202, initial coarse clusters 302, 304 may be determined using, for example, image similarity as described above. At 204, sample frames from each initial cluster may be selected. For example, sample frames 306, 308 may be selected from cluster 302, and sample frames 310, 312 may be selected from cluster 304. In this example, sample frame 306 may be an image of a dog, sample frame 308 may be an image of a cat, and both sample frames 306 and 308 may be images of a bird. At 206, the quality of clusters 302 and 304 may be determined using, for example, VR results similarity, as described above. In this example, it may be determined that frames 306 and 308 are not sufficiently similar and that frames 310 and 312 are sufficiently similar. In this case, at 208, cluster 302 may be divided into new clusters 314, 316, and cluster 304 may not be divided. Then process 200 may repeat step 204 and select sample frames 318, 320 from cluster 314 and sample frames 322, 324 from cluster 316. Steps 204-208 may be repeated until the final clusters are determined, and at 210, representative frames may be selected from the final clusters.

Figure 4:
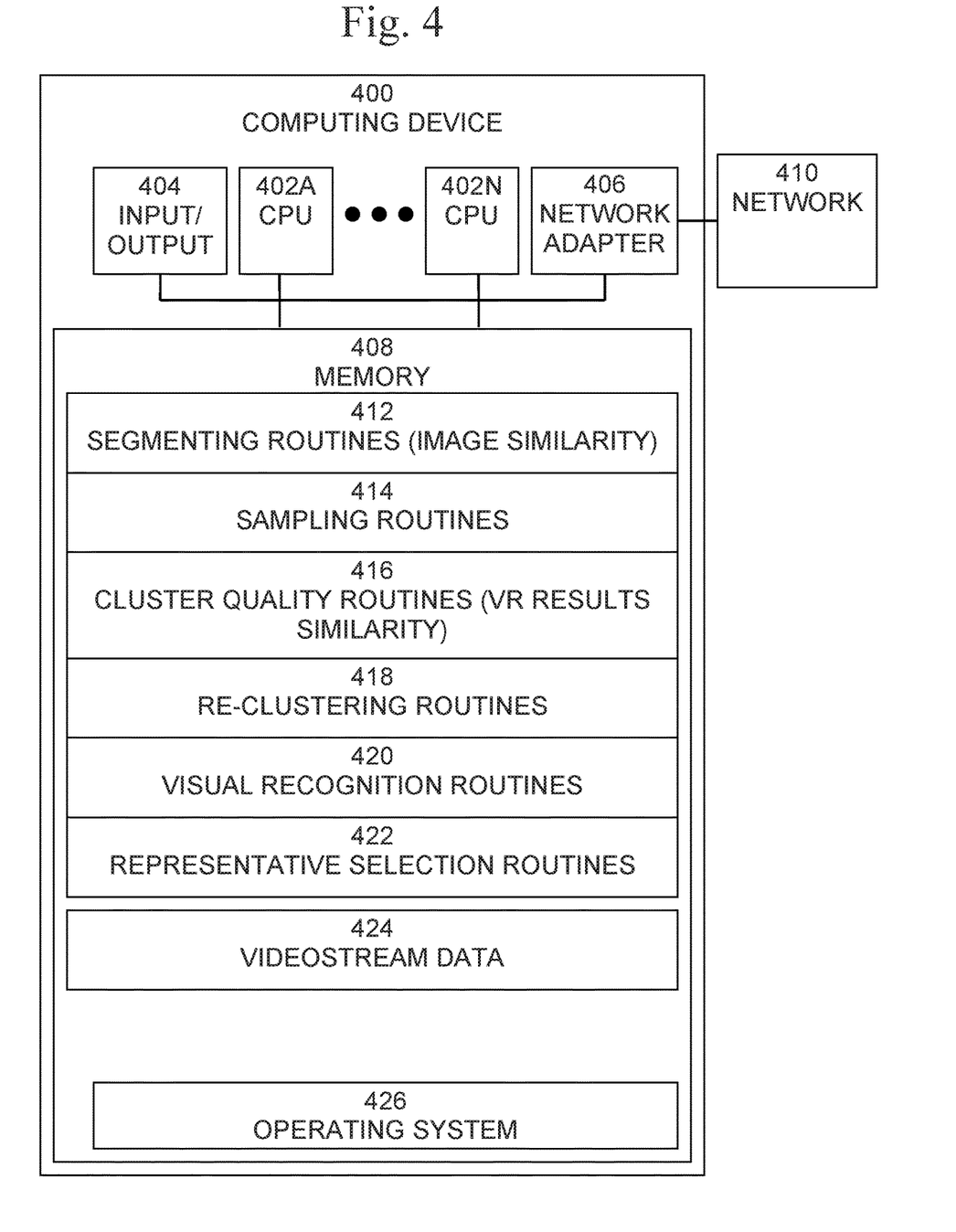
FIG. 4 is an exemplary block diagram of a computer system, in which processes involved in the embodiments described herein may be implemented.

An exemplary block diagram of a computer system 400, in which processes involved in the embodiments described herein may be implemented, is shown in FIG. 4. Computer system 400 may be implemented using one or more programmed general-purpose computer systems, such as embedded processors, systems on a chip, personal computers, workstations, server systems, and minicomputers or mainframe computers, or in distributed, networked computing environments. Computer system 400 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present communications systems and methods also include embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 4, memory 408 may include segmenting routines 412, sampling routines 414, cluster quality routines 416, re-clustering routines 418, visual recognition routines 420, and representative selection routines 422, video stream data 424, and operating system 426. Segmenting routines 412 may include software routines to coarsely segment scenes present in video stream data 424 using, for example, image similarity, as described above. Sampling routines 414 may include software routines to perform sampling on clusters using, for example, frames having a large separation or distance from each other, as described above. Cluster quality routines 416 may include software routines to determine the similarity of the sampled frames within each cluster using, for example, VR results similarity, as described above. Re-clustering routines 418 may include software routines to re-cluster the clusters to improve their clustering quality, as described above. Visual recognition routines 420 may include software routines to recognize objects in video frames and generate descriptive tags, as described above. Representative selection routines 422 may include software routines to select a frame from each cluster that is representative of the images in the cluster, as described above. Video stream data 424 may include a stream or series of still images, as described above. Operating system 426 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of visual recognition processing, implemented in a computer system comprising a processor, memory accessible by the processor, and computer program instructions stored in the memory and executable by the processor, the method comprising:
    coarsely segmenting video frames of video stream into a plurality of clusters based on scenes of the video stream;
    sampling a plurality of video frames from each cluster;
    determining a quality of each cluster, wherein determining the quality of each cluster is based on a visual recognition results similarity of the clusters; and
    re-clustering the video frames of video stream to improve the quality of at least some of the clusters.

2. The method of claim 1, wherein coarsely segmenting video frames of video stream is based on an image similarity of the scenes.

3. The method of claim 2, wherein sampling the plurality of video frames comprises sampling two frames in the cluster having a maximum distance or maximum dissimilarity from each other.

4. The method of claim 3, further comprising:
    repeating:
    the sampling on the re-clustered video frames;
    the determining the quality of each cluster on the re-clustered video frames; and
    the re-clustering the video frames of video stream;
    wherein the visual recognition improves the quality of the clustering and the re-clustering improves the quality of the visual recognition.

5. The method of claim 4, further comprising, once final clusters have been determined, selecting a representative image from each cluster for visual recognition.

6. The method of claim 5, wherein at least some of the selected representative images from each cluster represent a center of the cluster.

7. A system for visual recognition processing, the system comprising a processor, memory accessible by the processor, and computer program instructions stored in the memory and executable by the processor to perform:
    coarsely segmenting video frames of video stream into a plurality of clusters based on scenes of the video stream;
    sampling a plurality of video frames from each cluster;
    determining a quality of each cluster, wherein determining the quality of each cluster is based on a visual recognition results similarity of the clusters; and
    re-clustering the video frames of video stream to improve the quality of at least some of the clusters.

8. The method of claim 7, wherein coarsely segmenting video frames of video stream is based on an image similarity of the scenes.

9. The system of claim 7, wherein sampling the plurality of video frames comprises sampling two frames in the cluster having a maximum similarity distance or maximum dissimilarity from each other.

10. The system of claim 9, further comprising:
    repeating:
    the sampling on the re-clustered video frames;
    the determining the quality of each cluster on the re-clustered video frames; and
    the re-clustering the video frames of video stream;
    wherein the visual recognition improves the quality of the clustering and the re-clustering improves the quality of the visual recognition.

11. The system of claim 10, further comprising, once final clusters have been determined, selecting a representative image from each cluster for visual recognition.

12. The system of claim 11, wherein at least some of the selected representative images from each cluster represent a center of the cluster.

13. A computer program product for visual recognition processing, the computer program product comprising a non-transitory computer readable storage having program instructions embodied therewith, the program instructions executable by a computer, to cause the computer to perform a method comprising:
    coarsely segmenting video frames of video stream into a plurality of clusters based on scenes of the video stream;
    sampling a plurality of video frames from each cluster;
    determining a quality of each cluster, wherein determining the quality of each cluster is based on a visual recognition results similarity of the clusters; and
    re-clustering the video frames of video stream to improve the quality of at least some of the clusters.

14. The computer program product of claim 13, wherein coarsely segmenting video frames of video stream is based on an image similarity of the scenes.

15. The computer program product of claim 14, wherein sampling the plurality of video frames comprises sampling two frames in the cluster having a maximum similarity distance or maximum dissimilarity from each other.

16. The computer program product of claim 15, further comprising:
    repeating:
    the sampling on the re-clustered video frames;
    the determining the quality of each cluster on the re-clustered video frames; and
    the re-clustering the video frames of video stream; and
    wherein the visual recognition improves the quality of the clustering and the re-clustering improves the quality of the visual recognition.

17. The computer program product of claim 16, further comprising, once final clusters have been determined, selecting a representative image from each cluster for visual recognition.

18. The computer program product of claim 17, wherein at least some of the selected representative images from each cluster represent a center of the cluster.

* * * * *